United States Patent [19]
Ciolfi

[11] 3,825,214
[45] July 23, 1974

[54] FLAG HOLDER
[76] Inventor: Quentin P. Ciolfi, Rt. 1, Box 110, Miami, Fla. 32570
[22] Filed: Aug. 16, 1973
[21] Appl. No.: 388,990

[52] U.S. Cl................... 248/43, 248/314, 403/112, 403/361
[51] Int. Cl........................................... F16m 13/02
[58] Field of Search............ 248/38, 40, 42, 43, 39, 248/314; 403/112, 361

[56] References Cited
UNITED STATES PATENTS
| | | | |
|---|---|---|---|
| 1,790,803 | 2/1931 | Francis | 248/39 |
| 2,256,142 | 9/1941 | Dean | 248/39 |
| 2,322,600 | 6/1943 | Stahler | 248/44 |
| 3,722,841 | 3/1973 | Ciolfi | 248/43 |

Primary Examiner—William H. Schultz

[57] ABSTRACT

An improved flag holder which includes optional means for a quick release attachment in the form of a slot to interconnect to the rear axle of a bicycle or motorcycle or other type of axle for a vehicle and which also includes a through opening adjacent to the slot whereby the flag holder may be more permanently attached to the axle of a vehicle and which includes holder means with stop means to orient the holder in a predetermined position relative to the holder and to securely hold the same in a fixed anchored position which includes a web and portions deformed out of the plane of the web and defining the holder means and stop means.

4 Claims, 3 Drawing Figures

PATENTED JUL 23 1974 3,825,214

FLAG HOLDER

FIELD OF THE INVENTION

This invention relates to a flag holder and, more particularly, this invention relates to an improved flag holder which includes mounting means for attachment to the threaded end of an axle shaft on a bicycle or other vehicle, and holding means to hold the flag in upstanding relation with respect to the holder in a predetermined position and attitude with respect to it, said holder including stop means and rigidifying means and effectively reinforcing the flag and maintaining it in a fixed orientation.

DESCRIPTION OF THE ART GENERALLY

As is described in U.S. Pat. No. 3,722,841, vehicle operators often desire to display a flag; however, the flags are often damaged or stolen.

This invention has as an object the provision of an improved inexpensive simple to construct flag holder which is adapted for a quick mounting to a bicycle for display of the flag and which comprises an improvement over the flag holder described and claimed in U.S. Pat. No. 3,722,841.

OBJECTS OF THE INVENTION

It is an object of this invention to provide a one-piece inexpensive flag holder of deformed material including a web, stop means intermediate the web and in line with a holding means to limit penetration of a flag staff into the holding means and means to anchor the flag staff relative to the web in a predetermined position and orientation and means for attaching the flag staff and holder to a bicycle axle in either a permanent or a easily removable arrangement, as will be described more fully hereinafter.

In accordance with these and other objects which will become apparent hereinafter, the instant invention will now be described with reference to the accompanying drawings in which:

DESCRIPTION OF THE PREFERRED EMBODIMENT

Figure 3:
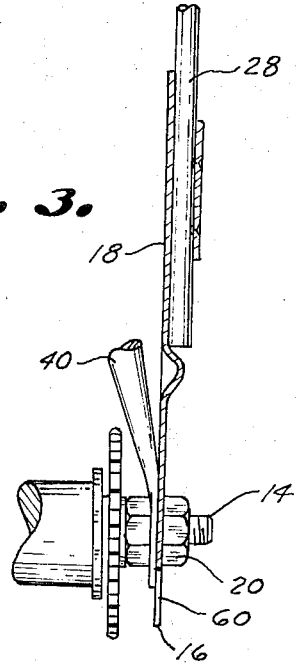
FIG. 3 is a view in cross section taken on the plane indicated by the line 3—3 of FIG. 1 and looking in the direction of the arrows and illustrating the mounting of the flag staff to the rear axle of the bicycle of FIG. 1.

Referring to the drawings wherein like reference characters designate like or corresponding parts throughout the several views, the numeral 12 generally designates a bicycle which has a rear axle 14, see FIG. 3, the distal end of which is threaded and which extends from a generally vertical surface, indicated by the numeral 16. Otherwise stated, in a more general manner, it can be said that the numeral 12 generally designates a vehicle having a surface 16 which is generally vertical and from which there protrudes a threaded member 14.

Figure 1:
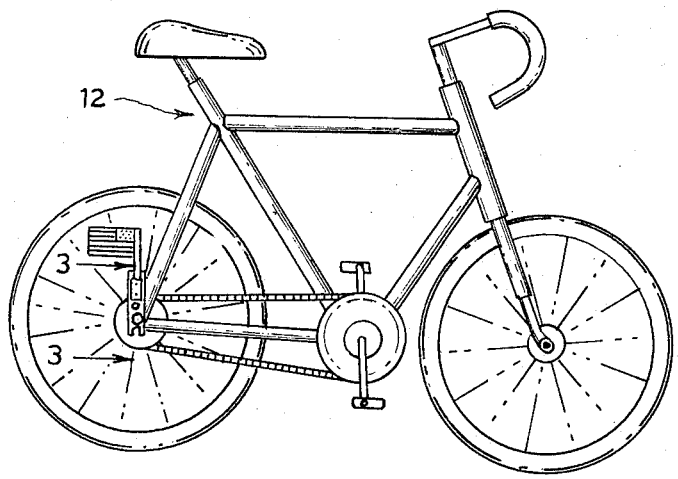
FIG. 1 is a side elevation view of a bicycle with the improved flag holder mounted to the rear axle thereof.

It is to this threaded member that the improved flag holder 18 is to be connected by passing the threaded member through an opening in the holder or a slot and, thereafter, clamping it in place by a keeper nut 20 threadably advanced to clamp the flag holder to the member after it has been arranged in a generally vertical attitude as illustrated in FIG. 1, to display the flag 26.

Figure 2:
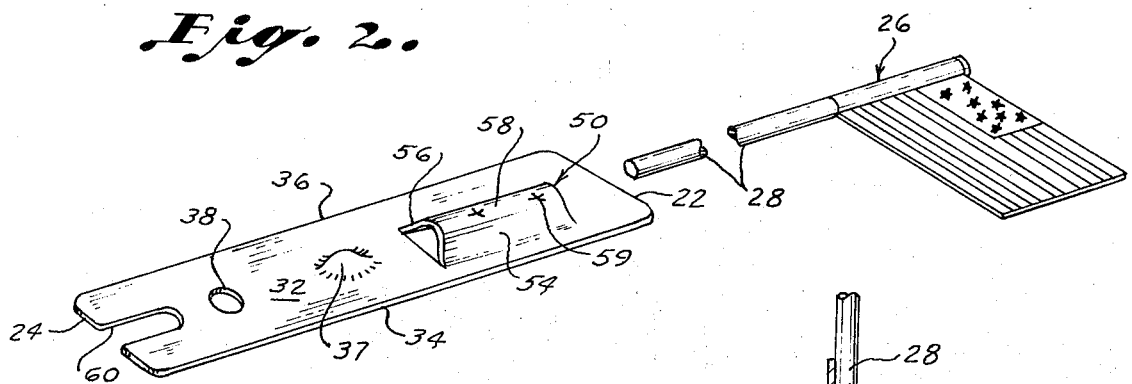
FIG. 2 is a perspective view of the flag holder according to the instant invention and illustrating the same in relation to a staff of a flag.

With more specific reference to the holder, see FIGS. 2 and 3, it is seen that it includes an elongate web which is designated by the numeral 32 having side edges 34 and 36. In the preferred embodiment, the web is of metal, preferably 16 gauge steel, or, alternatively, it is of a rigid plastic of the class which includes polyvinyl chloride. The length of the body is preferably in the range of five to eight inches for use on bicycles or motorcycles and with the width of the web 32 being about one inch. The mounting means adapting the holder for attachment to the protruding member is for use in combination with the keeper nut 20 as will now be described. A hole or opening 38 is provided in the web adjacent the first end 24 which is opposite of the second end or upper end 22, said hole or opening being spaced inwardly from the lower end or first end 24 and being centrally arranged in the web a distance from the end edge which is in the range of between three-quarter inch and one and one-half inches in the preferred embodiment. The hole preferably is circular and of a diameter which is slightly greater than the three eighths inch diameter of a conventional size rear axle for use on a bicycle, as illustrated in the drawing.

In use, the holder 18 is mounted to the member 14 in the following manner. The shaft 14 is passed through the hole 38 with the rigidifying means 50 to be described hereinafter facing outwardly as shown. Thereafter, the keeper nut 20 is applied to cause the surface of the web 32 to abuttingly overlay the lower distal end of the brace 40 or nut and to hold the flag holder in a vertically oriented upstanding position, see FIG. 1. Once the nut 20 has been securely tightened against the exterior surface of the web, it will resist a tendency to loosening rotation by wind forces when the vehicle is travelling and additionally, the holder cannot be removed except by the use of a tool to threadably withdraw the keeper nut.

The holding means for the staff of the flag holder will now be described. The holding means comprises a rigidifying means generally designated by the numeral 50 and which also comprises the holding means. As shown in the drawings, the rigidifying means comprises a portion intermediate the central zone of the web and the upper end 22 which is deformed out of the plane of the web between lateral slit lines 56 and that at the end of the arrow 50 defining a wall 58 which merges and blends with the main plane of the web as indicated by the numeral 54. There is, thus defined an upper and lower facing opening of a passageway between the wall and the web, this passageway is generally sized to receive the staff in snug relation. Intermediate the slit 56 and the opening 38 there is provided a stop means to limit penetration of the lower end of the flag staff 28, the stop means comprising a dimple 37 which is deformed out of the plane of the web and in a line through the slot 60, opening 38 and passageway between the wall 58 and web 34. Means to anchor the flag staff within the holding means are provided in the form of a weakened zone such as that designated by the numeral 59 in the wall 58 which is adapted to be deformed as indicated in FIG. 3 by impact of a sharp instrument, such as a nail to cause the interior surface of the rigidifying means to bite into or grip the flag staff once it has been positioned.

Optional means are provided for connecting the flag holder to a bicycle comprising an elongate longitudinally extending central slot 60 open at the first end and extending depthwise toward but not to the opening 38 so that the flag staff may be positioned over the axle with the nut 20 clamping it on the margins of the surface whereby the flag and holder may be removed by a quick upwardly directed jerk and, when ready to be used again, replaced.

In the preferred embodiment the longitudinal extension of the rigidifying means is preferably at least one inch and in the range of between one and two inches so as to provide a relatively substantial orienting force along a substantial portion of the shaft or staff of the flag.

What is claimed is:

1. An improved holder for receiving and holding in a generally vertical orientation a flag staff for display of a flag on the staff, said holder being of the type which is adapted to be mounted on a vehicle having a surface with a protruding threaded member and including:
   a one-piece body having an elongate web, said web having a first and a second end zone, a through opening spaced inwardly and adjacent said first end zone sized for passage of said threaded protruding member and adapted to be secured thereto by a nut threadably advanced toward said surface to press the web into abutting engagement therewith,
   a slot in said first end zone extending longitudinally toward but not to said opening, said slot being sized to receive the threaded protruding member,
   rigidifying means longitudinally extending intermediate the central zone of the web and said second end zone, said rigidifying means comprising a lateral cut in said web at opposite ends of said rigidifying means and a wall deformed outwardly of said web, said wall and said web being connected along the longitudinally extending side edges of said rigidifying means and defining a socket with an opening facing said first end zone and an opening facing said second end zone and having a generally uniform cross section throughout the length of said rigidifying means, said cross section being sized to receive said flag staff upon passage of it therethrough, stop means in the central zone of said web intermediate said rigidifying means and said opening and comprising a dimple deformed out of said web and limiting penetration of said staff in said holding means,
   holding means on said rigidifying means comprising a weakened zone on said wall adapted to be deformed inwardly upon impact by a sharp instrument to constrict the passage between the rigidifying means and the web to anchor a flag staff to the holder, and
   a nut having a threaded bore sized for threaded advancement on the protruding threaded member to captivate the web on said member when said protruding member is passed either through said opening or said slot is positioned over said protruding member.

2. The device as set forth in claim 1 wherein said body is of metal.

3. The device as set forth in claim 2 wherein said metal is of 16 gauge.

4. The device as set forth in claim 1 wherein said body is of rigid plastic material.

* * * * *